US006681868B2

(12) United States Patent
Kovach et al.

(10) Patent No.: US 6,681,868 B2
(45) Date of Patent: Jan. 27, 2004

(54) RIP STRIP PRIMARY TILLAGE SYSTEM

(75) Inventors: Michael G. Kovach, Morton, IL (US); Rickey L. Gerber, Roanoke, IL (US)

(73) Assignee: Case, LLC, Racine, WI (US)

( * ) Notice: Subject to any disclaimer, the term of this patent is extended or adjusted under 35 U.S.C. 154(b) by 1 day.

(21) Appl. No.: 10/340,432

(22) Filed: Jan. 10, 2003

(65) Prior Publication Data

US 2003/0141088 A1 Jul. 31, 2003

Related U.S. Application Data

(60) Provisional application No. 60/352,304, filed on Jan. 28, 2002.

(51) Int. Cl.[7] ............................................. A01B 13/02
(52) U.S. Cl. ........................ 172/701; 172/146; 172/176
(58) Field of Search ................... 172/701, 146, 172/174, 175, 176, 178, 180; 111/52, 57, 60, 140, 180

(56) References Cited

U.S. PATENT DOCUMENTS

| 4,187,916 A | * | 2/1980 | Harden et al. ............... 172/146 |
| 4,245,706 A | | 1/1981 | Dietrich, Sr. ................ 172/180 |
| 4,361,191 A | * | 11/1982 | Landoll et al. ............. 172/146 |
| 4,403,662 A | | 9/1983 | Dietrich, Sr. ................ 172/156 |
| 4,538,689 A | | 9/1985 | Dietrich, Sr. ................ 172/700 |
| 4,682,658 A | * | 7/1987 | Erickson ....................... 172/73 |
| 5,080,178 A | | 1/1992 | Dietrich, Sr. ................ 172/153 |
| 5,474,135 A | * | 12/1995 | Schlagel ....................... 172/151 |
| 5,499,685 A | * | 3/1996 | Downing, Jr. ............... 172/699 |
| 5,603,269 A | * | 2/1997 | Bassett .......................... 111/52 |
| 5,622,227 A | * | 4/1997 | McDonald ................... 172/146 |
| 5,660,126 A | * | 8/1997 | Freed et al. ................. 111/140 |
| 5,704,430 A | * | 1/1998 | Smith et al. .................. 172/29 |
| 6,554,078 B1 | * | 4/2003 | McDonald ..................... 172/69 |
| 6,557,646 B1 | * | 5/2003 | Hurtis et al. ................ 172/156 |

FOREIGN PATENT DOCUMENTS

| EP | 620962 A1 | * | 10/1994 | ................ 172/701 |
| SU | 1127530 | * | 12/1984 | ................ 172/701 |
| SU | 1440363 | * | 11/1988 | ................ 172/701 |

OTHER PUBLICATIONS

Bush Hog SC–9000 Soil Conservur brochure, Jan. 12, 1983, 4 pages.*
CultiSystem 5000 Combination Tillage Implement brochure, Jan. 16, 1985, 2 pages.*

* cited by examiner

*Primary Examiner*—Victor Batson
(74) *Attorney, Agent, or Firm*—Rebecca Henkel

(57) ABSTRACT

An agricultural tillage implement is disclosed employing a series of apparatus to perform one-pass primary tillage. A coulter is the first apparatus that works the field. These coulters cut, size and part the residue without mixing it into the seedbed. Next, a tillage shank runs a point through the compaction layer to fracture and loosen the soil, providing proper soil aggregate size and air pore space relationship throughout the shank tillage profile. Next is a pair of soil-gathering blades that capture and gather the loose soil and residue together and to create a berm of a mixture of soil and residue. The last apparatus to work the field is a rotary reel that conditions the strip of soil to give ideal seed-to-soil contact and uniform berm size.

20 Claims, 2 Drawing Sheets

RIP STRIP PRIMARY TILLAGE SYSTEM

CROSS REFERENCE TO RELATED APPLICATIONS

This application claims the benefit of copending U.S. Provisional Patent Application Serial No. 60/352,304, filed on Jan. 28, 2002. It is also related to U.S. patent application Ser. No. 10/339,874, filed simultaneously herewith and entitled "Soil Surface Tillage Point in Combination of Primary Tillage Shank System", and U.S. patent application Ser. No. 10/340,138, also filed simultaneously herewith and entitled "Row Cleaner in Combination of Primary Tillage Shank System".

BACKGROUND OF THE INVENTION

The present invention relates generally to an agricultural tillage implement, and more particularly to such an implement that represents a tillage system using a combination of coulters, tillage shanks, soil-gathering blades, and rotary reels, that produces an ideal tilled strip ready for planting seed with no additional passes. This single pass implement provides improved crop residue management and better soil tilth resulting in superior seedbed conditions.

Single-pass tillage implements providing both shallow and primary tillage in a single pass using disks and chisel points are also not generically new, as shown by U.S. Pat. Nos. 4,245,706; 4,403,662; and 4,538,689. These machines, however, do not create the best possible seedbed, i.e., do not create the soil conditions that best promote seed germination and plant growth.

During the late 1970's, before the machine shown in U.S. Pat. No. 4,403,662 became available, primary tillage was accomplished principally with moldboard plows. The moldboard plow leaves large slabs and chunks of soil that tend to break down during the freeze and thaw cycles of winter, but this type of plowing requires substantial working of the soil in the spring in order to level the field and prepare it for planting of the next crop. Moreover, moldboard plowing is not an effective remedy for soil erosion, and actually has a tendency to exacerbate this problem.

In recent years, farmers have recognized the long-term detrimental effects to the land characteristic of traditional farming techniques, and have been searching and experimenting for ways to decrease soil and wind erosion. The use of a large disk assembly in front of a chisel plow on a parabolic shank has gone a long way toward accomplishing these objectives and also breaks up the hard plow pan (or "sole") that is created at the particular depth at which the plow is set to operate, caused by repeated tillage at the same depth over the years. The parabolic shank and winged point do reduce soil erosion, but this practice also may create large chunks of soil, and usually requires substantial spring soil working to prepare an adequate seedbed for planting.

During the 1970's, the cutter chisel was widely used. It consisted of a chisel plow with a row of coulters to cut the residue ahead of two rows of staggered shanks, generally on thirty-inch centers. These shanks had a four-inch twisted point attached to perform the primary tillage. The tip of the point was at approximately a 45° angle to the horizontal, sloping downwardly and forwardly from the shank. The worked soil followed the curvature of the generally C-shaped shank that was attached to the chisel plow and was twisted in order to provide a moldboard-type turning action. A C-shaped shank, of the type described, is shown in U.S. Pat. No. 4,403,662.

For early cutter chisel plows, there was a net lateral movement of soil. A machine with, for example, eleven shanks would be equipped with five right-hand and six left-hand twisted points. The result was that a wide groove and a large berm were left after a pass. The machine as shown in U.S. Pat. No. 4,403,662 was an improvement because it left a smaller groove and not as large a berm by using fore-and-aft sets of disks and an improved point.

In U.S. Pat. No. 4,538,689, there is disclosed a winged point mounted on a parabolic shank. That winged point, in the combination shown, creates a large, rough surface similar to the surface of the moldboard plow used during the late 1970's and early 1980's. The wings on these points are set at a soil lift, twist and roll angle of approximately 30°. This lift angle was conventional at the time, but it is an aggressive angle that causes the wings to lift the soil abruptly. In some soils, particularly more compacted soils, the combination of an aggressive lift angle on the wings of the point, together with a parabolic shank, that is designed to lift and heave soil, lifted larger soil chunks and threw them out of the paths of the chisel plow and away from cooperating disks, making it difficult to create a level soil surface after a pass of the machine.

During the 1980's, farmers began to desire less tillage to prepare for planting. The furrows left by the chisel shanks had to be filled with the berms that were created between each shank. In order to fill these furrows behind large parabolic shanks, smaller shanks were placed to run shallower and were located midway between the larger chisel shanks. This resulted in smaller grooves on reduced centers. With the development of the disk leveler shown in U.S. Pat. No. 5,080,178, the furrows behind the shanks were substantially filled without leaving sizeable grooves after the shanks had passed, thus improving the level or "smoothness" of the surface.

As today's farming operators are trying to combine multiple tillage operations into fewer passes, while maintaining or improving yields and reducing erosion, Crop Residue Management (CRM) has become a well-accepted practice. CRM is a year-round system beginning with the selection of crops that produce sufficient quantities of residue and may include the use of cover crops after low residue-producing crops. CRM includes all field operations that affect residue amounts, orientation and distribution throughout the seasonal period requiring protection. Tillage systems included, among others, under CRM are no-till, ridge-till, mulch-till and reduced-till. A change in tillage and planting operations to increase crop residues on the soil surface has been shown to produce crop yields generally equal to or higher than those produced by systems that leave little or no residue on the field after planting. However, more residue means fewer trips across the field, which translates to lower fuel bills, less soil compaction, and less wear and tear on equipment.

SUMMARY OF THE INVENTION

It is an object of the instant invention to provide an agricultural tillage implement employing a series of apparatus to perform one-pass primary tillage, called "Rip-Strip Tillage", that fits within the definition of CRM practices. A coulter is the first apparatus that works the field. These disks cut the residue and loosen the solid ahead of the tillage shank. Next, tillage shank units run tillage points in the compaction layer, fracturing and further loosening the layer and relocating the soil particles, providing proper soil aggregate size and air pore space relationship throughout the shank tillage profile. Third is a pair of soil-gathering blades that capture and gather the loose solid and residue together and create a berm of a mixture of soil and residue. The last apparatus to work the field is a rotary reel, or row conditioning system, that conditions the strip of soil to give ideal seed-to-soil contact and uniform berm size. As used herein, primary tillage means deep soil plowing, in an approximate range of 8 to 14-inches or greater. Secondary tillage may be in an approximate range of 3 to 6-inches.

It is another object of the instant invention to provide an agricultural tillage implement that is designed to perform complete tillage of the soil in a single pass while leaving a raised-berm seedbed.

It is a further object of the instant invention to provide an agricultural tillage implement that supports the Crop Residue Management approach to farming.

These and other objects are obtained by providing an agricultural tillage implement employing a series of apparatus to perform one-pass primary tillage. A coulter is the first apparatus that works the field. These coulters part the residue without mixing it into the seedbed. Next, a tillage shank runs a point through the compaction layer to fracture and loosen the soil, providing proper soil aggregate size and air pore space relationship throughout the shank tillage profile. Next is a pair of soil-gathering blades that capture and gather the loose soil and residue together and to create a berm of a mixture of soil and residue. The last apparatus to work the field is a rotary reel that conditions the strip of soil to give ideal seed-to-soil contact and uniform berm size.

DETAILED DESCRIPTION OF THE PREFERRED EMBODIMENT

Poor root development is a common yield limitation of no-till caused often by compacted soil with limited or poorly distributed pore spacing (to hold air and water). Proper pore size and distribution is critical for air and water exchange, which improves potential water infiltration and utilization—essential for healthy plant development.

The implement of the instant invention is comprised of several elements or apparatus, assembled in a unique combination, or system, to create an ideal field condition for growing plants. By shattering the compaction layer and reorienting the soil aggregates, this system creates a healthier soil profile than similar machines of earlier design. The improved soil profile allows roots to expand into a greater volume of soil and obtain more nutrients, especially during the most critical times of the plant production cycle. Soil nutrient availability is foremost a function of good soil tilth. When the root zone has the ideal balance of minerals and organic matter and pore spacing, the plants thrive.

Slow seed germination and non-uniform plant stands, caused by seedbeds that are too cold, wet or dry, or poor seed-to-soil contact, are other common yield limitations in no-till farming. By creating a berm with the implement of the instant invention, usually 2 to 3-inches above the unworked soil surface at planting, the seedbed can dry down and warm up faster. This allows for quicker, more uniform stands that utilize sunlight, water and nutrients more effectively.

The implement to be described results in superior soil compaction relocation by shattering compaction, improved soil tilth, superior residue management and an ideal tilled strip ready for planting seed with no additional pass. This system solves the poor development yield limitations of no-till applications discussed above.

Figure 1:
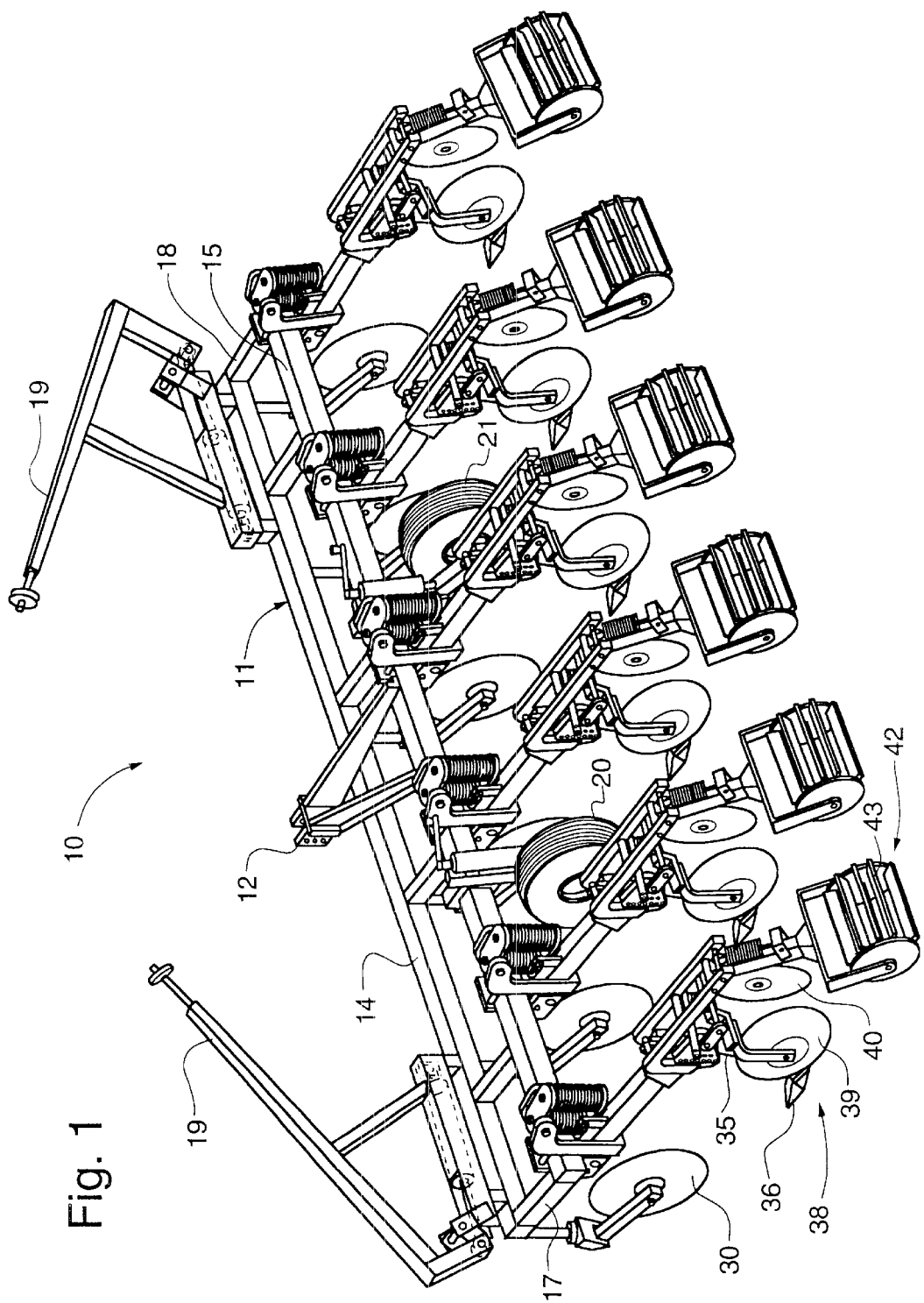
FIG. 1 is a top perspective view of an implement embodying the rip strip primary tillage system of the instant invention.
Figure 2:
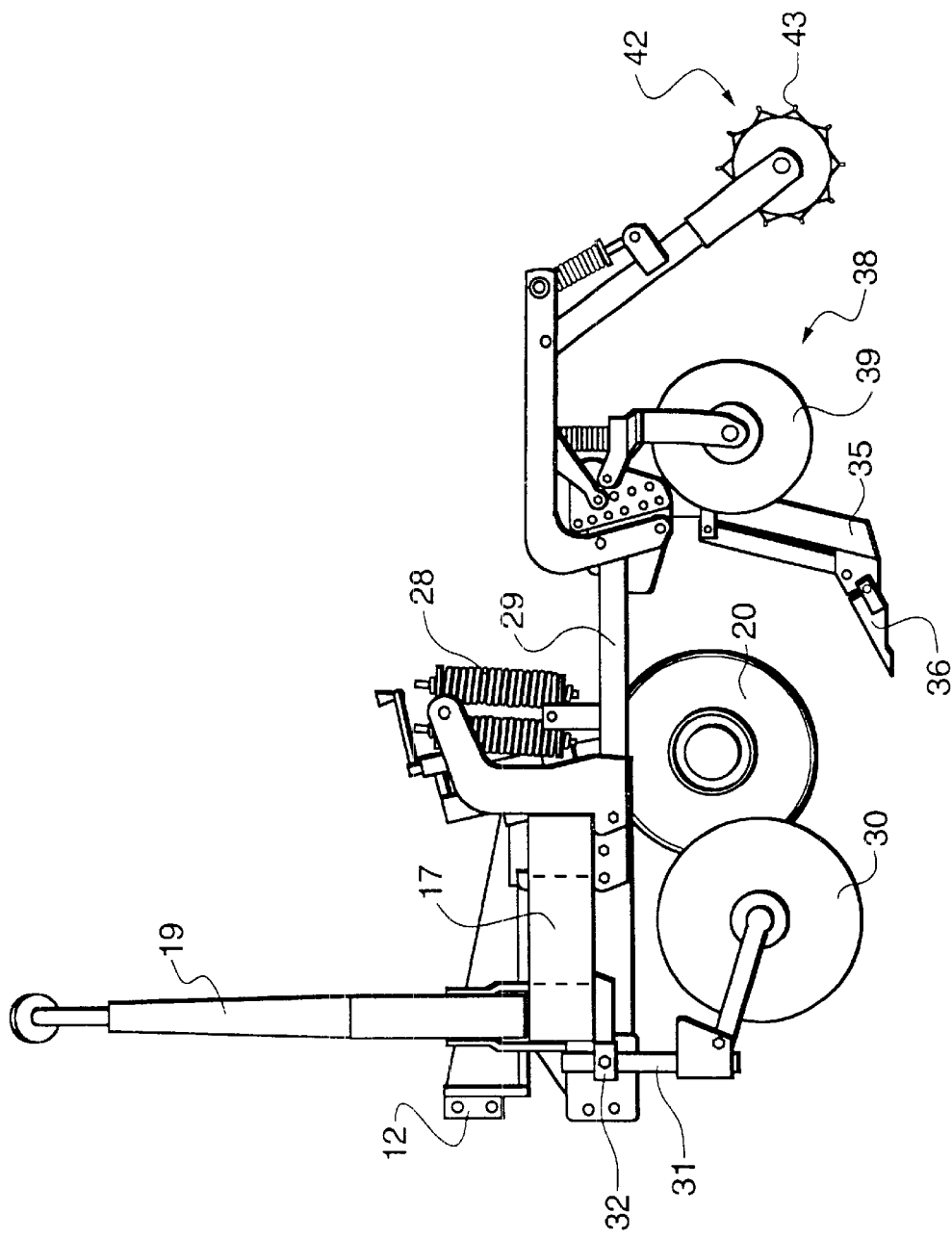
FIG. 2 is a partial side elevational view of the implement shown in FIG. 1.

Referring now to FIG. 1, reference numeral 10 generally designates the preferred embodiment of the tillage implement of the instant invention. Implement 10 includes a main frame generally designated 11 that is adapted to be attached at its front to the rear of an agricultural tractor by means of a conventional 3-point hitch 12. Larger main frames incorporate foldable toolbar wings for reduced transport widths. Frame 11 is a substantial structure intended to withstand significant operational forces and to maintain its integrity for many years of reliable service. Two generally parallel and coextensive elongate box beams, 14, 15 interconnected at the ends thereof by beams 17, 18 and by additional beams therebetween. Additionally, the structural support legs of hitch 12 are affixed to each of beams 14, 15 adding strength to the hitch and the main frame. Box beams 14, 15 serve not only as the primary structural members of the mains frame, but also as toolbars. The main frame may take other shapes and may be constructed of different materials and structural elements, the important result being a sound configuration to adequately support the various components of the implement to be further described below. This particular design, which in practice is made primarily of 4×6 or 6×6-inch box beams, allows for long life and durability, additional residue flow, and provides the weight necessary to penetrate the toughest soil conditions.

Frame 11 is supported for movement across a field or along a road by gauge wheels 20, 21 that may be of any known construction and design. Gauge wheels 20, 21 are each part of a unitized structure that includes a sturdy screw-adjustment for depth regulation, as well as pins to retain adjustment, all of which is attached to elongate frame member 14 or 15 by known clamping devices that allow the wheel units to be selectively placed along the length of frame member 15 as part of an adjustment of the spacing between seedbed strips. Depth indicators may also be added to make fine-tuning of depth penetration more convenient. Two such wheel units are shown in the drawings; however, depending upon the size and weight of the implement and the type of wheels used, more wheels may be appropriate. It is also possible that the particular configuration of elements, and the size and weight of the tractor being used, may benefit from the addition of lift-assist wheels, not shown in the drawings. Lift-assist wheels are known in the agricultural industry as add-on structure that minimizes hitch stress and helps the tractor's 3-point hitch lift implements, as well as safer tractor steering and stopping. Such units may include a stabilizing torque-tube to minimize wobble and ensure stable transport. Lift-assist wheels may also be adjustable for level field operation and optimum transport height.

Row markers 19 are shown in both figures. These are key to setting up or straightening existing rows. As is obvious from the drawings, these units are movable, usually hydraulically, between transport positions, as seen in the figures, and operational positions where they pivot outwardly to contact the soil, leaving a small visible furrow.

Raising or lowering the front of the main frame is accomplished by raising or lowering the 3-point hitch of the tractor. The 3-point hitch and the gauge wheels 20, 21, adjust the depth of penetration of the soil-engaging elements.

Implement 10 is comprised of a series of similar working units, each unit including a series of apparatus; in the configuration shown in FIG. 1 there are six such working units. For purposes of discussion these will be referred to as "working units" even though they are not necessarily unitized in construction, i.e., some parts of each working unit are attached separately to the main frame 11 rather than being assembled separately and attached to the frame as a unit. This is not to say that a unitized structure could not be used, but rather the preferred embodiment is not thus constructed. These working units come in various types, numbers and spacing to best fit the needs of the user.

As best seen in FIG. 1B, rail 29 is pivotable relative to the main frame and has a shock-absorbing capability provided by springs 28. Longitudinal rail 29 is adjustably attached to frame member 15, similar to wheels 20, 21, with the various earth-working apparatus attached thereto. The first apparatus to engage the soil is a coulter 30 that cuts residue and loosens the soil ahead of the tillage shank generally without mixing the residue into the seedbed. Coulter 30 results in cutting and sizing residue and smaller clod sizes in the finished field. The depth of coulter 30 is adjustable by moving adjustment rod 31 upwardly or downwardly within clamp 32, and is moved to compensate for various settings of the tillage depth. General practice would be to use a coulter with a diameter of approximately 22-inches. The coulters may be either wavy or flat depending upon desired results and working conditions. A wavy coulter is best at reducing clod size and loosening surface soil. For in-row root cutting and less surface disruption, a flat coulter would be selected.

Second in the system is a tillage shank 35 that is normally run at 8 to 14-inches deep. The shank itself should be either a no-till shank when uniform soil flow is required or a minimum disturbance shank for greater soil fracturing and maximum soil movement. Shank 35 has an attached tillage point 36, preferably either that shown in U.S. Pat. No. 6,276,462 or the no-till point shown in U.S. Pat. Nos. 4,538,689; 5,437,337; and 5,540,288. Either point runs in the compaction layer, fractures the layer and relocates the soil particles. Shank 35 is adjustable up and down to fine-tune the depth of penetration of the point 36.

Third in the system is a pair of gathering blades 38 that capture and gather the loose soil and residue together to create a berm of a mixture of soil and residue. This action fills in the groove left by shank 35 and gives ideal seed-to-soil contact for quick plant germination. As best seen in FIG. 1, blades 38 are comprised of two spaced-apart disc blades 39, 40 angled toward each other to move, or push, material into a berm. The blades are adjustable for depth, angle, and distance between blades to permit the operator to select the size of the berm. The blades may be dull-edge or sharp-edge depending upon how much soil is to be moved. Dull blades tend to ride on top, while sharp blades tend to dig in.

The final apparatus of the system is a rotary reel 42 that conditions the strip of soil to give ideal seed-to-soil contact and uniform berm size, thus promoting early, fast and uniform emergence. Additionally, the rotary reel is available with round or flat bars 43, which control the amount of soil conditioning. Flat bar baskets reduce clod size and fluff, and are normally used in fall conditions. Round bar baskets do more firming, and are normally used in spring conditions. The rotary reels are also adjustable in height and down-pressure to control the amount of berm conditioning the soil receives.

Many conventional elements or accessories known and used under normal circumstances have not be shown or discussed, but certainly would be employed under normal operating or transport conditions. For instance, this machine would normally have a jack stand attached near the forward end thereof to support the tongue when not connected to a tractor. Other items fitting this category are SMV signs, warning lights, locking pins, disk scrapers, shear bolts, and the like.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. For instance, as on of skill in this technology will readily understand, the turnbuckles shown and described may be replaced with hydraulic cylinders, operated and connected in a conventional manner, depending upon working conditions and operator preferences. Accordingly, the following claims are intended to protect the invention broadly as well as in the specific form shown.

Having thus described the invention, what is claimed is:

1. A rip strip primary tillage implement comprising:

a rigid main frame having a front end, an opposing rear end and opposing first and second sides extending therebetween, said main frame being generally horizontal in a plane parallel to the surface of the ground;

a hitch having one end connected to said main frame and an opposite forward end adapted to be connected to a vehicle for towing said tillage implement across a field;

a plurality of similar working units supported by said main frame at generally equal intervals between said first and second sides, each said working unit having a working line along which it works the soil generally in a straight line such that each said working unit works the soil and prepares a seedbed in a strip, and together said plurality of working units prepare a plurality of generally parallel continuous seedbeds in the direction of travel of said tillage implement;

said working units each comprising a series of generally in-line ground-working apparatus including, in a line generally along the respective said working line, a coulter arranged to cut residue and loosen the soil, a tillage shank to fracture and further loosen the soil, a pair of soil-gathering blades that capture and gather the loose soil and residue together and create a berm of a mixture of soil and residue, and a rotary reel that conditions the strip of soil to create a berm of generally uniform size.

2. The tillage implement of claim 1, wherein:

said coulter is a wavy coulter.

3. The tillage implement of claim 2, wherein:

said coulter is attached to said main frame and the depth to which said coulter engages the soil is adjustable by a clamp on said main frame.

4. The tillage implement of claim 3, wherein:

said coulter is approximately 22-inches in diameter.

5. The tillage implement of claim 4, wherein:

said tillage shank has a tillage point attached to the lower end thereof, and said tillage shank is adjustable to fine-tune the depth of penetration of said tillage point in the soil.

6. The tillage implement of claim 5, wherein:

said tillage point is set up to run selectively in the range of 8 to 14-inches below soil surface.

7. The tillage implement of claim 6, wherein:

said pair of soil-gathering blades are adjustable in depth, angle, and distance between blades to permit adjustment in the size of berm created by said pair of soil-gathering blades.

8. The tillage implement of claim 7, wherein:

said rotary reel is adjustable in height above the surface of the berm and in the amount of down-pressure to control the amount of conditioning the soil making up the berm receives.

9. The tillage implement of claim 8, wherein:

said rotary reel comprises flat bars.

10. The tillage implement of claim 8, wherein:

said rotary reel comprises round bars.

11. In a rip strip primary tillage implement having a wheeled main frame adapted to be towed through a field by a towing vehicle, said main frame having a front end, an opposing rear end and opposing first and second sides extending therebetween, said main frame further being generally horizontal in a plane parallel to the surface of the ground, the improvement comprising:

a plurality of similar working units supported by said main frame at generally equal intervals between said first and second sides, each said working unit having a working line along which it works the soil generally in a straight line such that each said working unit works the soil and prepares a seedbed in a strip, and together the said plurality of working units prepare a series of generally parallel continuous seedbeds in the direction of travel of said tillage implement;

said working units each comprising a series of in-line ground-working apparatus including, in a line from said front end of said main frame and extending in a line parallel to said working line, a coulter arranged to cut residue and loosen the soil, a tillage shank to fracture and further loosen the soil, a pair of soil-gathering blades that capture and gather the loose soil and residue together and create a berm of a mixture of soil and residue, and a rotary reel that conditions the strip of soil to create a berm of generally uniform size.

12. The tillage implement of claim 11, wherein:

said coulter is a wavy coulter.

13. The tillage implement of claim 12, wherein:

said coulter is attached to said main frame and the depth to which said coulter engages the soil is adjustable by a clamp on said main frame.

14. The tillage implement of claim 13, wherein:

said coulter is approximately 22-inches in diameter.

15. The tillage implement of claim 14, wherein:

said tillage shank has a tillage point attached to the lower end thereof, and said tillage shank is adjustable to fine-tune the depth of penetration of said tillage point in the soil.

16. The tillage implement of claim 15, wherein:

said tillage point is set up to selectively run in the range of 8 to 14-inches below soil surface.

17. The tillage implement of claim 16, wherein:

said pair of soil-gathering blades are adjustable in depth, angle, and distance between blades to permit adjustment in the size of berm created by said pair of soil-gathering blades.

18. The tillage implement of claim 17, wherein:

said rotary reel is adjustable in height above the surface of the berm and in the amount of down-pressure to control the amount of conditioning the soil in the berm receives.

19. The tillage implement of claim 18, wherein:

said rotary reel comprises flat bars.

20. The tillage implement of claim 18, wherein:

said rotary reel comprises round bars.

* * * * *